US012502701B2

(12) United States Patent
Taysom et al.

(10) Patent No.: US 12,502,701 B2
(45) Date of Patent: Dec. 23, 2025

(54) SHEAR ASSISTED EXTRUSION APPARATUS, TOOLS, AND METHODS

(71) Applicant: Battelle Memorial Institute, Richland, WA (US)

(72) Inventors: Brandon Scott Taysom, West Richland, WA (US); Md. Reza-E-Rabby, Richland, WA (US); Scott A. Whalen, West Richland, WA (US)

(73) Assignee: Battelle Memorial Institute, Richland, WA (US)

(*) Notice: Subject to any disclaimer, the term of this patent is extended or adjusted under 35 U.S.C. 154(b) by 0 days.

(21) Appl. No.: 17/857,951

(22) Filed: Jul. 5, 2022

(65) Prior Publication Data

US 2024/0009725 A1 Jan. 11, 2024

(51) Int. Cl.
*B21C 25/02* (2006.01)
*B21C 23/00* (2006.01)
(Continued)

(52) U.S. Cl.
CPC ............ *B21C 25/02* (2013.01); *B21C 23/001* (2013.01); *B21C 23/085* (2013.01); *B21C 29/003* (2013.01); *B29C 48/301* (2019.02)

(58) Field of Classification Search
CPC ..... B21C 23/001; B21C 23/085; B21C 25/02; B21C 27/02; B29C 48/301
(Continued)

(56) References Cited

U.S. PATENT DOCUMENTS 3,284,851 A * 11/1966 Zernay .................. B29C 48/301 425/319
3,432,369 A 3/1969 Naastepad
(Continued)

FOREIGN PATENT DOCUMENTS

CN 106140847 A 11/2016
CN 107282671 A 10/2017
(Continued)

OTHER PUBLICATIONS

WO PCT/US2020/053168 Search Rpt, Feb. 8, 2021, Battelle Memorial Institute.
(Continued)

*Primary Examiner* — Jared O Brown
*Assistant Examiner* — Matthew Stephens
(74) *Attorney, Agent, or Firm* — Schwegman, Lundberg & Woessner, P.A.

(57) ABSTRACT

Shear assisted extrusion apparatus, tools, inserts, and/or methods are provided. The apparatuses can include: an extrusion receiving channel operably engaged with a tool to receive extruded material; and one or more openings aligned between the spindle ends, the openings configured to convey fluid to the extruded product. Example tools can include one or more openings aligned between the tool ends. Example methods can include quenching plasticized feed material before exiting the spindle. A spindle assembly and/or tool assembly inserts are also provided that can include a sleeve extending within one or both of the spindle assembly or tool assembly of the apparatus; and openings within the sleeve configured to convey fluid to within one or both of the receiving channel of the spindle assembly or the tool assembly.

26 Claims, 19 Drawing Sheets

(51) Int. Cl.
*B21C 23/08* (2006.01)
*B21C 29/00* (2006.01)
*B29C 48/30* (2019.01)

(58) Field of Classification Search
USPC .................................................. 72/253.1, 262
See application file for complete search history.

(56) References Cited

U.S. PATENT DOCUMENTS 3,640,657 A 2/1972 Rowe et al.
3,661,726 A 5/1972 Denes
3,684,593 A 8/1972 Benz et al.
3,884,062 A 5/1975 Green
3,892,603 A 7/1975 Reid
3,933,536 A 1/1976 Doser et al.
3,977,918 A 8/1976 Paladino et al.
3,989,548 A 11/1976 Morris
4,287,749 A 9/1981 Bachrach et al.
4,300,378 A 11/1981 Thiruvarudchelvan
4,585,473 A 4/1986 Narasimhan et al.
4,778,542 A 10/1988 Clemens
4,801,340 A 1/1989 Inoue et al.
4,808,224 A 2/1989 Anderson et al.
4,892,596 A 1/1990 Chatterjee
4,985,085 A 1/1991 Chatterjee
5,026,438 A 6/1991 Young et al.
5,089,060 A 2/1992 Bradley et al.
5,167,138 A * 12/1992 Sinha .................... B21C 23/005 72/262
5,242,508 A 9/1993 McCallum et al.
5,262,123 A 11/1993 Thomas et al.
5,283,130 A 2/1994 Bradley et al.
5,437,545 A 8/1995 Hirai
5,461,898 A 10/1995 Lessen
5,470,401 A 11/1995 McCallum et al.
5,492,264 A 2/1996 Wadleigh
5,737,959 A 4/1998 Korbel et al.
5,739,498 A 4/1998 Sunamoto et al.
5,964,117 A 10/1999 Holroyd et al.
5,988,484 A 11/1999 Osborn et al.
6,022,424 A 2/2000 Sellers et al.
6,036,467 A 3/2000 Jameson
6,638,462 B2 10/2003 Davidson et al.
6,843,405 B2 1/2005 Okamoto et al.
6,898,954 B2 * 5/2005 Twigg ..................... B21C 23/01 72/271
6,940,379 B2 9/2005 Creighton
7,096,705 B2 8/2006 Segal
7,314,670 B2 1/2008 Bartsch et al.
7,322,508 B2 1/2008 Chang
7,954,692 B2 6/2011 Fukuda
8,016,179 B2 9/2011 Burford
8,240,540 B2 8/2012 Tanaka et al.
8,313,692 B2 11/2012 Somekawa et al.
8,695,868 B2 4/2014 Messer et al.
10,189,063 B2 1/2019 Lavender et al.
10,369,748 B2 8/2019 Whalen et al.
10,695,811 B2 6/2020 Joshi et al.
11,045,851 B2 6/2021 Joshi et al.
2002/0029601 A1 3/2002 Kwok
2004/0057782 A1 3/2004 Okamoto et al.
2004/0099030 A1 5/2004 Twigg et al.
2004/0238501 A1 12/2004 Kawazoe et al.
2004/0265503 A1 12/2004 Clayton et al.
2006/0005898 A1 1/2006 Lui et al.
2006/0027628 A1 2/2006 Sutherlin et al.
2008/0029581 A1 2/2008 Kumagai et al.
2008/0048005 A1 2/2008 Forrest et al.
2008/0202653 A1 8/2008 Ignberg
2008/0251571 A1 10/2008 Burford
2009/0072007 A1 3/2009 Nagano
2009/0269605 A1 10/2009 Warke et al.
2009/0291322 A1 11/2009 Watanabe et al.
2010/0059151 A1 3/2010 Iwamura et al.
2010/0089976 A1 4/2010 Szymanski et al.
2010/0132430 A1 6/2010 Tsai et al.
2011/0104515 A1 5/2011 Kou et al.
2011/0132970 A1 6/2011 Nakagawa et al.
2011/0309131 A1 12/2011 Hovanski et al.
2012/0006086 A1 1/2012 Manchiraju et al.
2012/0052322 A1 3/2012 Hatakeyama et al.
2012/0168045 A1 7/2012 Ihara et al.
2012/0223451 A1 9/2012 Hulseman et al.
2012/0258332 A1 10/2012 Hatakeyama et al.
2013/0075452 A1 3/2013 Burford
2014/0000332 A1 1/2014 Wilson et al.
2014/0002220 A1 1/2014 Johnson et al.
2014/0076957 A1 3/2014 Sayama et al.
2014/0102159 A1 * 4/2014 Denison ................ B21C 29/003 72/253.1
2014/0102161 A1 4/2014 Stewart
2014/0103570 A1 4/2014 Stewart et al.
2014/0248508 A1 9/2014 Ohhama et al.
2014/0283574 A1 9/2014 Lavender et al.
2014/0291886 A1 10/2014 Mark et al.
2014/0328710 A1 11/2014 Cui et al.
2015/0075242 A1 3/2015 Eller et al.
2015/0115019 A1 4/2015 Pascal et al.
2015/0360317 A1 12/2015 Kalvala et al.
2016/0008918 A1 1/2016 Burford
2016/0151817 A1 6/2016 Nayfeh et al.
2016/0151818 A1 6/2016 Shao
2016/0167353 A1 6/2016 Fan et al.
2016/0175981 A1 6/2016 Kandasamy
2016/0175982 A1 6/2016 Kandasamy et al.
2016/0184922 A1 6/2016 Kikyo
2016/0228932 A1 8/2016 Hayashi et al.
2016/0354860 A1 12/2016 Boettcher et al.
2017/0008121 A1 1/2017 Li
2017/0056947 A1 3/2017 Lavender et al.
2017/0136686 A1 5/2017 Ueno et al.
2017/0163135 A1 6/2017 Emberton et al.
2017/0182587 A1 6/2017 Tokoro et al.
2017/0216961 A1 8/2017 Utter et al.
2017/0225265 A1 8/2017 Ito et al.
2017/0304933 A1 10/2017 Miles et al.
2017/0355003 A1 12/2017 TenHouten et al.
2018/0036840 A1 2/2018 Hu et al.
2018/0043467 A1 2/2018 Huysmans
2018/0050419 A1 2/2018 Das et al.
2018/0311713 A1 11/2018 Joshi et al.
2018/0354231 A1 12/2018 Iwase
2018/0369889 A1 12/2018 Zhang et al.
2019/0267153 A1 8/2019 Kappagantula et al.
2019/0275608 A1 9/2019 Das et al.
2020/0047233 A1 2/2020 Stewart
2021/0086291 A1 3/2021 Okada et al.
2021/0205918 A1 7/2021 Fujii et al.
2021/0252632 A1 8/2021 Eller et al.
2022/0152677 A1 5/2022 Whalen et al.

FOREIGN PATENT DOCUMENTS

EP 2990178 8/2014
GB 1258141 12/1971
JP 2003-275876 9/2003
JP 2007-222925 9/2007
WO WO PCT/US2019/040730 1/2021
WO WO-2021059465 A1 * 4/2021 ........... B21C 23/005
WO WO PCT/US2020/053168 4/2022
WO WO PCT/US2021/050022 12/2022
WO WO-2024162984 A2 8/2024
WO WO-2024162984 A3 8/2024

OTHER PUBLICATIONS

WO PCT/US2020/053168 Written Opin, Feb. 8, 2021, Battelle Memorial Institute.

(56) References Cited

OTHER PUBLICATIONS

WO PCT/US2021/05022 Search Rpt, Feb. 3, 2022, Battelle Memorial Institute.
WO PCT/US2021/050022 Written Opin, Feb. 3, 2022, Battelle Memorial Institute.
WO PCT/US2023/015228 Search Rpt, Jun. 15, 2023, Battelle Memorial Institute.
WO PCT/US2023/015228 Written Opin, Jun. 15, 2023, Battelle Memorial Institute.
WO PCT/US22/43532 Search Rept, Jan. 12, 2023, Battelle Memorial Institute.
WO PCT/US22/43532 Written Opin, Jan. 12, 2023, Battelle Memorial Institute.
Abu-Farha, "A Preliminary Study on the Feasibility of Friction Stir Back Extrusion", Scripta Materialia, 66, 2012, United States, 615-618.
Amancio-Filho et al., "Joining of Polymers and Polymer-Metal Hybrid Structures: Recent Developments and Trends", Polymer Engineering & Science, 2009, United States, pp. 1461-1476.
Bozzi et al., "Intermetallic Compounds in Al 6016/IF-Steel Friction Stir Spot Welds", Materials Science and Engineering, 2010, Netherlands, pp. 4505-4509.
Cole et al., "Lightweight materials for Automotive Applications", Materials Characterization, 35, 1995, United States, pp. 3-9.
Evans et al., "Friction Stir Extrusion: A new process for joining dissimilar materials", Manufacturing Letters, 5, 2015, United States, pp. 25-28.
Gann, J.A., "Magnesium Industry's Lightest Structural Metal", SAE Transactions, vol. 25-26, 1930-1931, United States, pp. 620-634, 641.
Hammond et al., "Equal-Channel Angular Extrusion of a Low-Density High-Entropy Alloy Produced by High-Energy Cryogenic Mechanical Alloying", JOM. vol. 66, No. 10, United States, 2014, pp. 2021-2029.
Kaiser et al., "Anisotropic Properties of Magnesium Sheet AZ31", Materials Science Forum, vols. 419-422, Switzerland, 2003, pp. 315-320.
Kuo et al., "Fabrication of High Performance Magnesium/Carbon-Fiber/PEEK/Laminated Composites", Materials Transactions, vol. 44, No. 8 (2003), Japan, pp. 1613-1619.
Leitao et al., "Aluminum-steel lap joining by multipass friction stir welding", Materials and Design, 106, 2016, United States, pp. 153-160.
Liu et al., "A Review of Dissimilar Welding Techniques for Magnesium Alloys to Aluminum Alloys", Materials, 7, 2014, United States, pp. 3735-3757.
Liu et al., "Microstructure and mechanical properties of equimolar FeCoCrNi high entropy alloy prepared via powder extrusion", Intermetallics 75 (2016) , United States, pp. 25-30.
Luo, Alan, "Magnesium: Current and Potential Automotive Applications", JOM, 54(2), 2002, United States, pp. 42-48.
Martinsen et al., "Joining of Dissimilar Materials", CIRP Annals—Manufacturing Technology, 2015, United States, 21 pages.
Nakamura et al., "Tool Temperature and Process Modeling of Friction Stir Welding", (2018) Modern Mechanical Engineering, 8, 78-94.
Office Action for U.S. Appl. No. 14/222,468, filed Mar. 21, 2014, First named inventor Curtis A. Lavender, Notification date Nov. 6, 2015, 10 pages.
Office Action for U.S. Appl. No. 14/222,468, filed Mar. 21, 2014, First named inventor Curtis A. Lavender, Notification date Apr. 1, 2016, 10 pages.
Office Action for U.S. Appl. No. 14/222,468, filed Mar. 21, 2014, First named inventor Curtis A. Lavender, Notification date May 20, 2016, 3 pages.
Office Action for U.S. Appl. No. 14/222,468, filed Mar. 21, 2014, First named inventor Curtis A. Lavender, Notification date Jan. 26, 2017, 9 pages.
Office Action for U.S. Appl. No. 14/268,220, filed May 2, 2014, First Named Inventor Jun Cui, Notification date Dec. 1, 2015, 7 pages.
Pickens, "Aluminum Powder Metallurgy Technology for High-Strength Applications", Journal of Materials Science 16 (1981) 1437-1457, United Kingdom, 21 pages.
Rodewald et al. "Top Nd—Fe—B Magnets with Greater Than 56 MGOe Energy Density and 9.8 kOe Coercivity", IEEE Transactions on Magnetics, vol. 38, No. 5, 2002, United States, pp. 2955-2957.
Saha, "Aluminum Extrusion Technology, Chapter 1, Fundamentals of Extrusion", The Materials Information Society, ASM International, 2000, United States, pp. 1-29.
ThomasNet.com, https:/www.thomasnet.com/articles/custom-manufacturing-fabricating/friction-stir-welding/ Feb. 10, 2011 (Year: 2011).
Trang et al., "Designing a Magnesium Alloy with High Strength and High Formability", Nature Communications, 2018, United Kingdom, 6 pages.
Whalen et al., "High Ductility Aluminum Alloy Made from Powder by Friction Extrusion", Materalia 6 (2019) 100260, Netherlands, 6 pages.
Whalen et al., U.S. Appl. No. 15/694,565, filed Sep. 1, 2017, titled "System and Process for Joining Dissimilar Materials and Solid-State Interocking Joint with Intermetallic Interface Formed Thereby", 69 pages.
Zhang et al., "Numerical Studies on Effect of Axial Pressure in Friction Stir Welding", (2007) Science and Technology of Welding and Joining, vol. 12, No. 3, United Kingdom, pp. 226-248.
"Application Serial No. PCT/US2023/026793, International Search Report mailed Sep. 10, 2024", 5 pgs.
"Application Serial No. PCT/US2023/026793, Written Opinion mailed Sep. 10, 2024", 10 pgs.
"Application Serial No. PCT/US2023/026793, IPRP mailed Jan. 16, 2025", 14 pgs.
Tang, W., et al., "Production of wire via friction extrusion of aluminum alloy machining chips", Journal of Materials Processing Technology vol. 210 Issue 15, (Nov. 19, 2010), 7 pages.
"Canadian Application Serial No. 3,260,954, Examiners Rule 86(2) Report mailed Jul. 15, 2025", 5 pages.

* cited by examiner

SHEAR ASSISTED EXTRUSION APPARATUS, TOOLS, AND METHODS

STATEMENT AS TO RIGHTS TO INVENTIONS MADE UNDER FEDERALLY-SPONSORED RESEARCH AND DEVELOPMENT

This invention was made with Government support under Contract DE-AC05-76RL01830 awarded by the U.S. Department of Energy. The Government has certain rights in the invention.

CROSS REFERENCE TO RELATED APPLICATION

This application is related to U.S. Continuation-In-Part Patent application Ser. No. 17/473,178 filed Sep. 13, 2021, entitled "Devices and Methods for Performing Shear-Assisted Extrusion and Extrusion Processes". the entirety of which is hereby incorporated by reference herein.

TECHNICAL FIELD

The present disclosure relates to metals technology in general, but more specifically to extrusion technology.

BACKGROUND

Increased needs for fuel efficiency in transportation coupled with ever increasing needs for safety and regulatory compliance have focused attention on the development and utilization of new materials and processes. In many instances, impediments to entry into these areas has been caused by the lack of effective and efficient manufacturing methods. For example, the ability to replace steel car parts with materials made from magnesium or aluminum or their associated alloys is of great interest. Additionally, the ability to form hollow parts with equal or greater strength than solid parts is an additional desired end. Previous attempts have failed or are subject to limitations based upon a variety of factors, including the lack of suitable manufacturing process, the expense of using rare earths in alloys to impart desired characteristics, and the high energy costs for production.

What is needed is a process and device that enables the production of items such as components in automobile or aerospace vehicles with hollow cross sections that are made from materials such as magnesium or aluminum with or without the inclusion of rare earth metals. What is also needed is a process and system for production of such items that is more energy efficient, capable of simpler implementation, and produces a material having desired grain sizes, structure and alignment so as to preserve strength and provide sufficient corrosion resistance. What is also needed is a simplified process that enables the formation of such structures directly from billets, powders or flakes of material without the need for additional processing steps. What is also needed is a process and associated equipment that reduces or eliminates the need for energy intensive thermal heat treatment steps before and/or after extrusion. What is also needed is a new method for forming high entropy alloy materials that is simpler and more effective than current processes. The present disclosure provides a description of significant advance in meeting these needs.

Over the past several years researchers at the Pacific Northwest National Laboratory have developed a novel Shear Assisted Processing and Extrusion (ShAPE) technique which uses a rotating tool as a ram or die receiving axially fed billet rather than an axially fed billet without rotations as is used in the conventional extrusion process. As described hereafter as well as in the previously cited, referenced, and incorporated patent applications, this process and its associated devices provide a number of significant advantages including reduced power consumption, fewer and less demanding heat treatments, better material properties, and new sets of "solid phase" types of forming process and machinery. Deployment of the advantages of these processes and devices are envisioned in a variety of industries and applications including but not limited to transportation, projectiles, high temperature applications, structural applications, nuclear applications, and corrosion resistance applications.

The present disclosure overcomes many requirements of the prior art by removing steps entirely and providing extruded materials that are higher in quality than those prepared from these prior art methods.

SUMMARY

Shear assisted extrusion apparatuses are provided. The apparatuses can include: a spindle assembly extending from a first end to a second end, the spindle assembly configured to rotate about a distance between the first and second end; a tool operably engaged with the spindle and defining the second end of the spindle assembly, the tool configured to engage feed material with shear force provided from the spindle; an extrusion receiving channel operably engaged with the tool to receive extruded material; and one or more openings aligned between the first and second end, the openings configured to convey fluid to the extruded product.

Shear assisted extrusion tools are also provided. The tools can include: a conduit extending from a first end to a second end, the first end defining a die face and configured to engage feed material, the second end configured to operably couple to a spindle of a shear assisted extrusion apparatus; and one or more openings aligned between the first and second end, the openings configured to convey fluid through interior walls of the conduit and/or die face.

Methods for quenching a product of shear assisted extrusion are also provided. The methods can include: providing shear assisted force to a die face operably engaged with a spindle of a shear assisted extrusion apparatus; and receiving plasticized raw material from the die face and quenching the plasticized feed material before exiting the spindle.

A spindle assembly and/or tool assembly insert is provided, including: a sleeve extending within one or both of the spindle assembly or tool assembly of the apparatus; and openings within the sleeve configured to convey fluid to within one or both of the receiving channel of the spindle assembly or the tool assembly.

The apparatuses, tools, inserts, and/or methods of the present disclosure are example configurations and are not exhaustive of all configurations contemplated.

DRAWINGS

Embodiments of the disclosure are described below with reference to the following accompanying drawings.

DESCRIPTION

This disclosure is submitted in furtherance of the constitutional purposes of the U.S. Patent Laws "to promote the progress of science and useful arts" (Article 1, Section 8).

Figure 1:
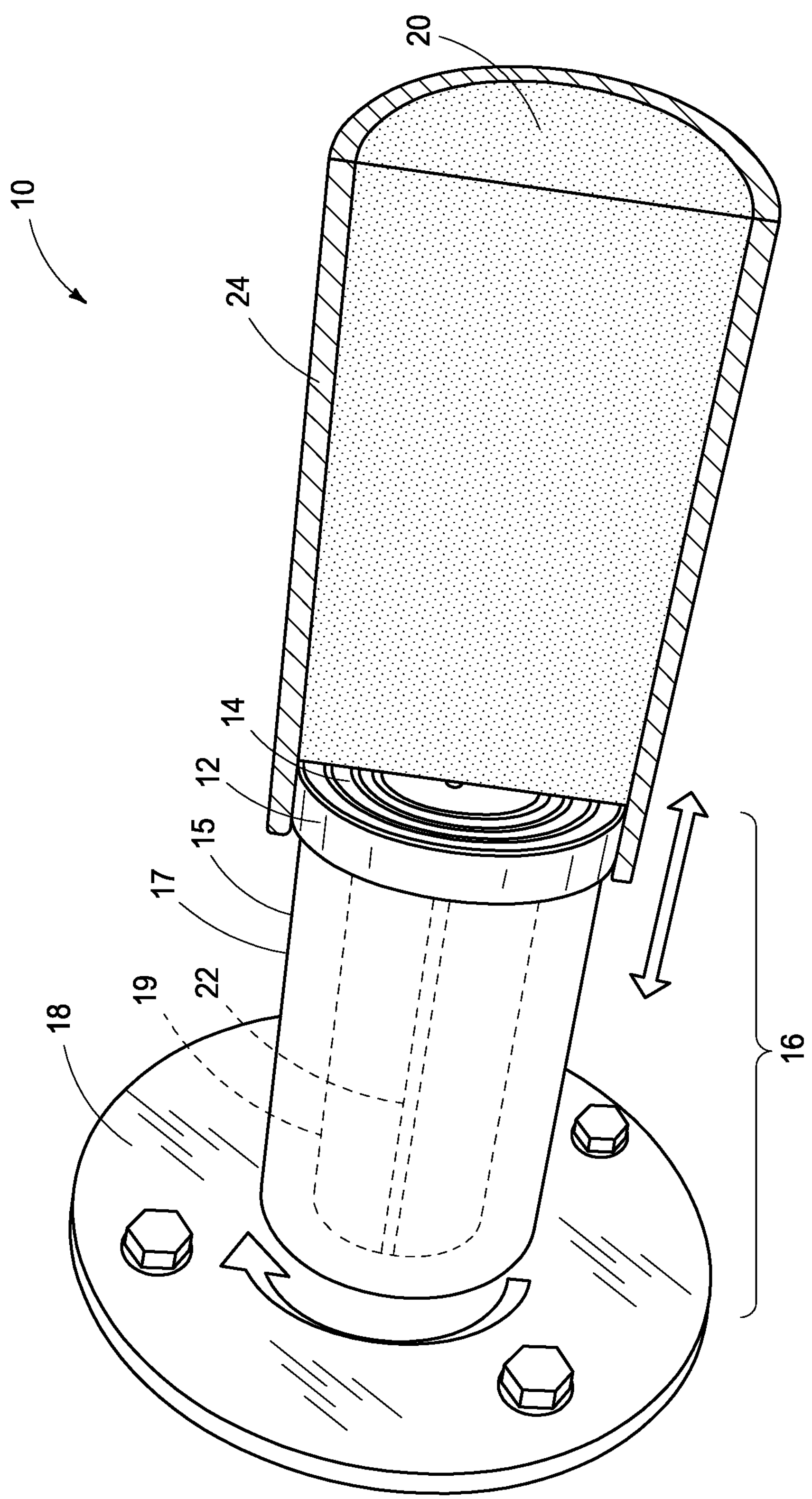
FIG. 1 is a portion of a shear assisted extrusion apparatus according to an embodiment of the disclosure.

The apparatuses, tools, and methods of the present disclosure will be described with reference to FIGS. 1-20. Referring first to FIG. 1, a portion of a shear assisted extrusion apparatus 10 is shown that includes feed material 20 within a feed material container 24 as well as a shear assisted extrusion tool 16 that includes a tool head 12 as well as a die face 14 extending to shank 15. Shank 15 can be defined by a tube having interior 19 and exterior sidewalls 17. Tool 16 also includes a flange 18 that can be operably coupled to a spindle assembly not yet shown. In this configuration, tool 16 is a single piece. Other configurations of tool 16 can be assemblies of multiple components. Example tool assemblies are depicted herein. As shown, a rotational force and axial force is applied to tool head 12. The axial force may be applied from the tool upon the feed material; alternatively, the axial force may be applied from the feed material upon the tool. In accordance with example implementations, the shear assisted extrusion process will provide an extrusion material 22.

Figure 2:
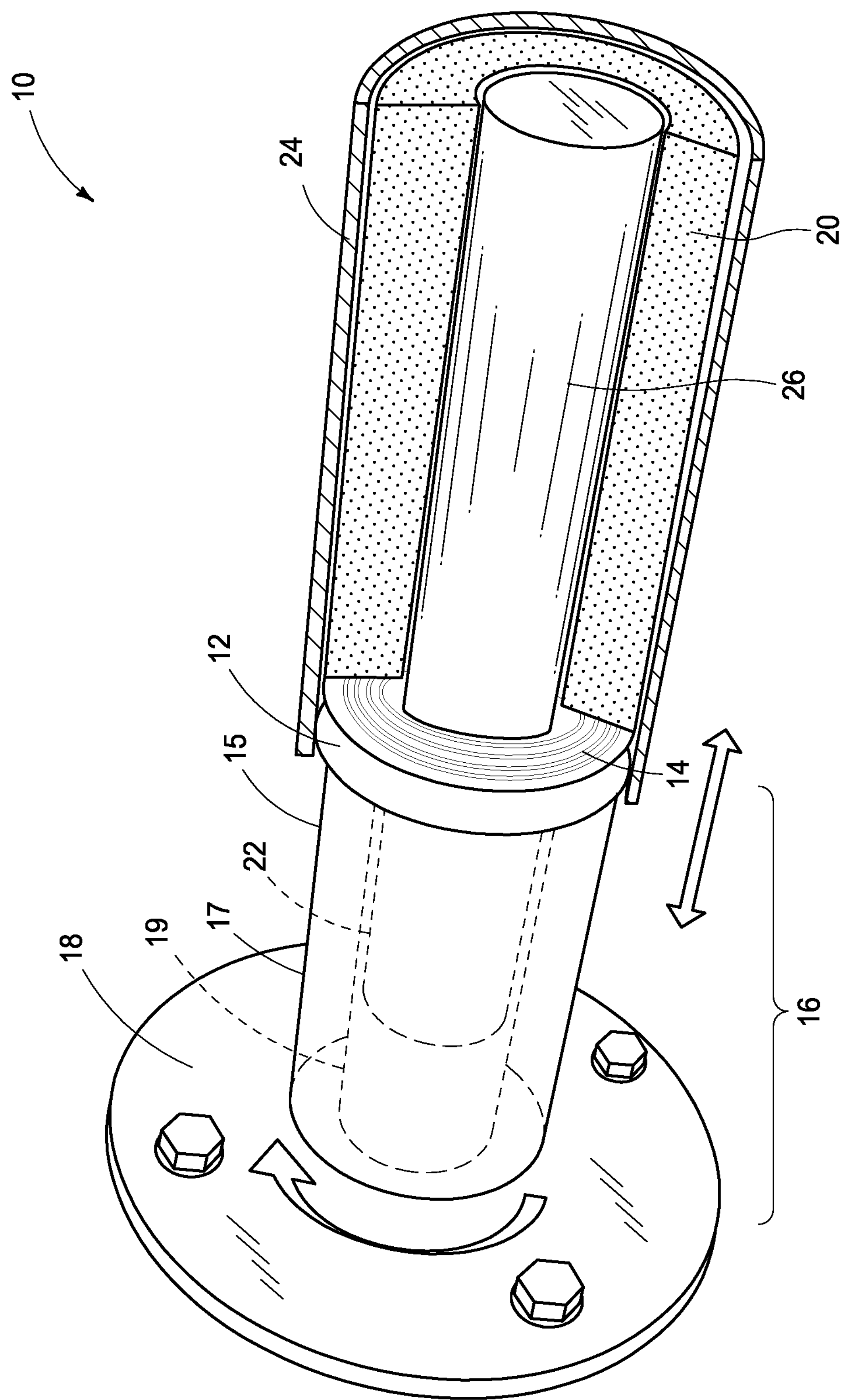
FIG. 2 is another configuration of a portion of a shear assisted extrusion apparatus according to an embodiment of the disclosure.

Referring next to FIG. 2, a portion 10 of an apparatus is shown that includes the use of a mandrel 26 that provides for feed material 20 to be provided to die face 14 and/or to within tool 16. Mandrel 26 can extend to die face 14 where feed material is plasticized and plasticized material continues as extrusion material within tool 16 to form extrusion material 22. Alternatively, mandrel 26 can continue beyond die face 14 and provide support for extrusion material within tool 16 after formation at die face 14. In accordance with example implementations, material 22 can take the shape of mandrel 26. Extrusion materials, including non-circular multi-cell profiles, can also be formed using a port hole bridge tool/die configuration as an alternative to the depicted mandrel approach.

Figure 3:
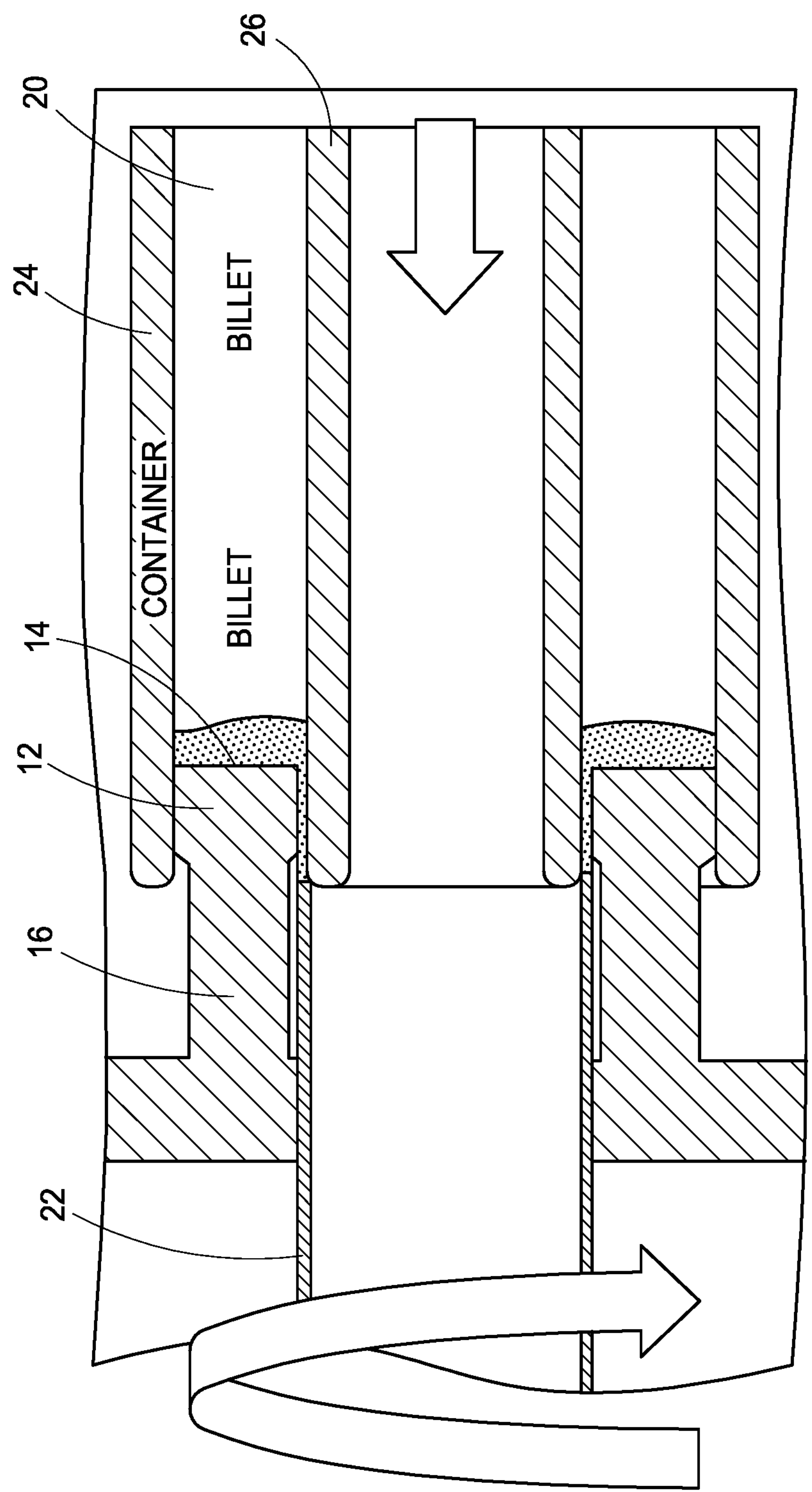
FIG. 3 is a more detailed view of a portion of a shear assisted extrusion apparatus according to an embodiment of the disclosure.

Referring next to FIG. 3, a cross sectional view of FIG. 2 is provided that includes mandrel 26 that supports feed materials also known as billets 20 within container 24. As shown, tool 16 can include a die face 14 as well as a tool head 12, and this provides for an extrusion material 22 formed upon a rotational and axial force as shown.

Figure 4:
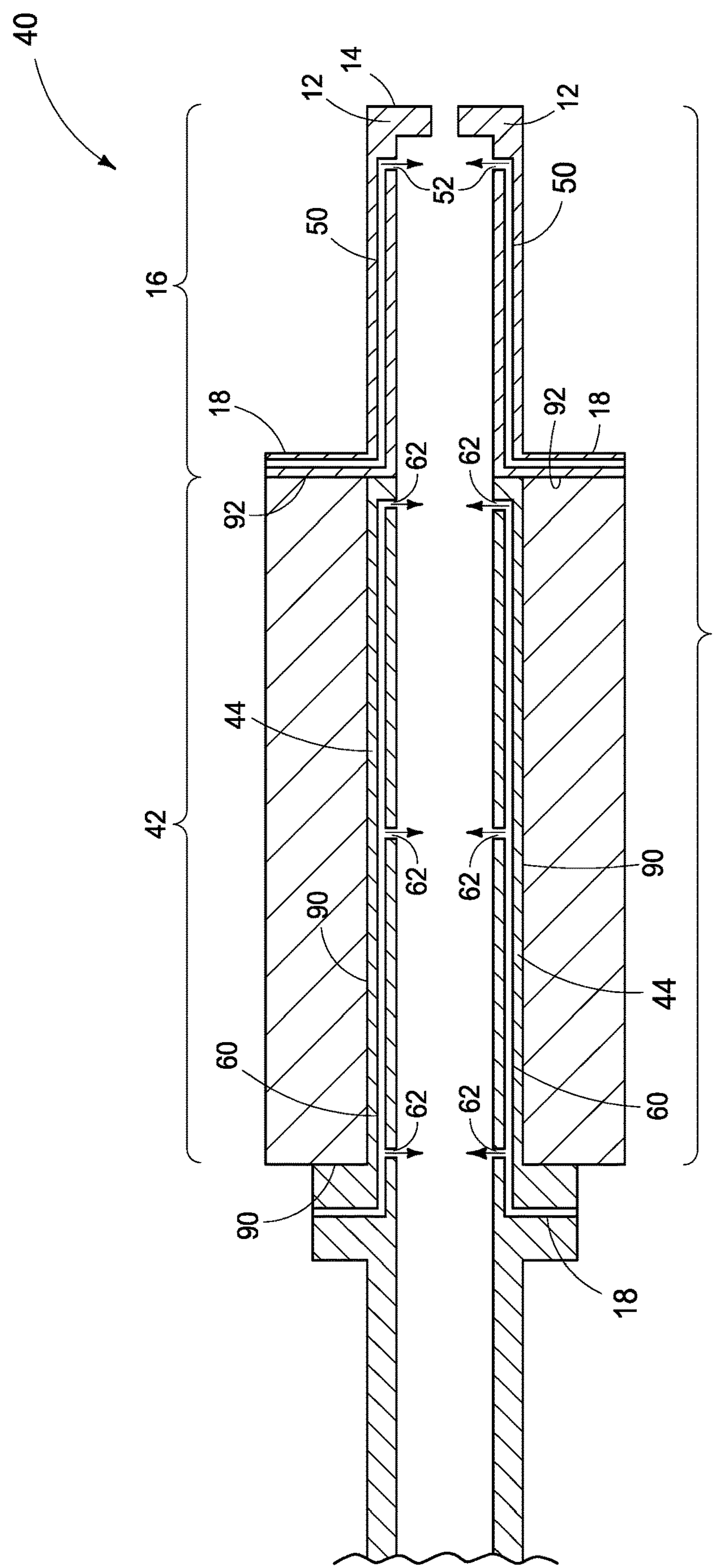
FIG. 4 is a depiction of a portion of a shear assisted extrusion apparatus according to an embodiment of the disclosure.

Referring next to FIG. 4, in accordance with example implementations, apparatus portion 40 is shown that includes both a tool 16 as well as a spindle 42 that rotates about a receiving channel 44. Importantly, receiving channel 44 is stationary or fixed in relation to spindle 42. Spindle 42 operably rotates tool 16 in order to provide the rotational force referred to herein, and this spindle extends from one end 92, where it couples with tool 16 at, for example, flange 18, and another end 90 where it couples with the remainder of the apparatus and rotation ends, allowing receiving channel 44 to continue as shown. Accordingly, interfaces 90 and 92 are shown that allow for spindle 42 to rotate while channel 44 remains fixed. Alternatively, at interface 92 between flange 18 and spindle 42, the components are fixed, thereby providing for rotation of tool 16 in accordance with rotation of spindle 42.

In accordance with example implementations and with reference to FIG. 4, passageways 60 are provided within receiving channel 44 and passageways 50 are provided to tool 16. As shown, openings 52 can enter the interior walls of tool 16 and openings 62 can enter the interior walls of the receiving channel from these passageways. To these passageways can be provided a fluid, such as a coolant. Examples of the coolant can include but are not limited to water, air, inert gas, liquid nitrogen, nitrogen mist, and/or quench oil.

Figure 5:
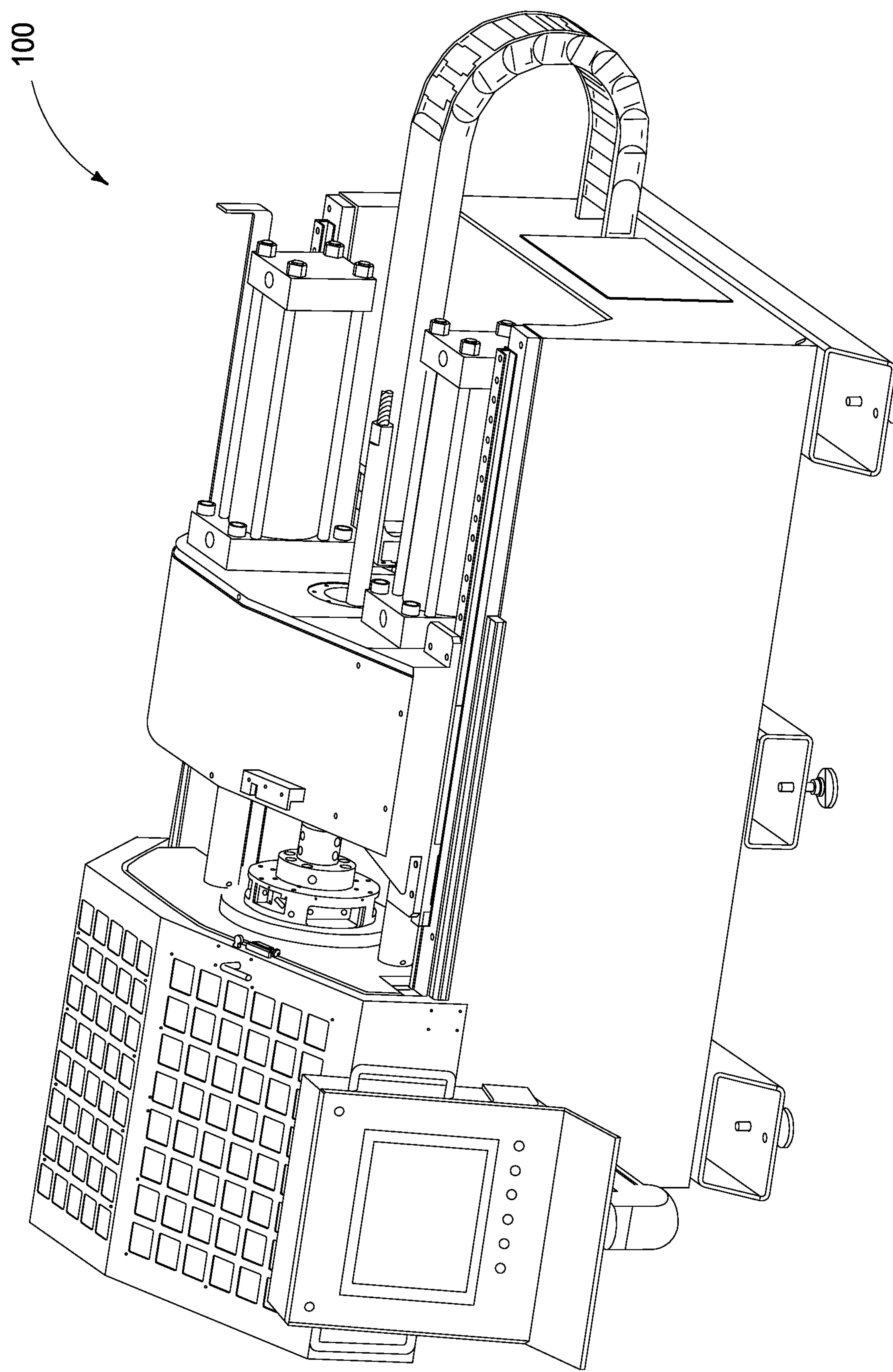
FIG. 5 is a shear assisted extrusion apparatus according to an embodiment of the disclosure.

Referring next to FIG. 5, the portions of the apparatus provided herein can be operably engaged using a complete apparatus as shown. This example apparatus is known as a "Friction Extrusion Machine" or "Shear Assisted Processing and Extrusion Machine", examples and operation of which are further provided in U.S. patent application Ser. No. 17/473,178 filed Sep. 13, 2021, which was published Dec. 30, 2021, as Publication No. US 2021/0402471 A1, the entirety of which is incorporated herein by reference.

Figure 6:
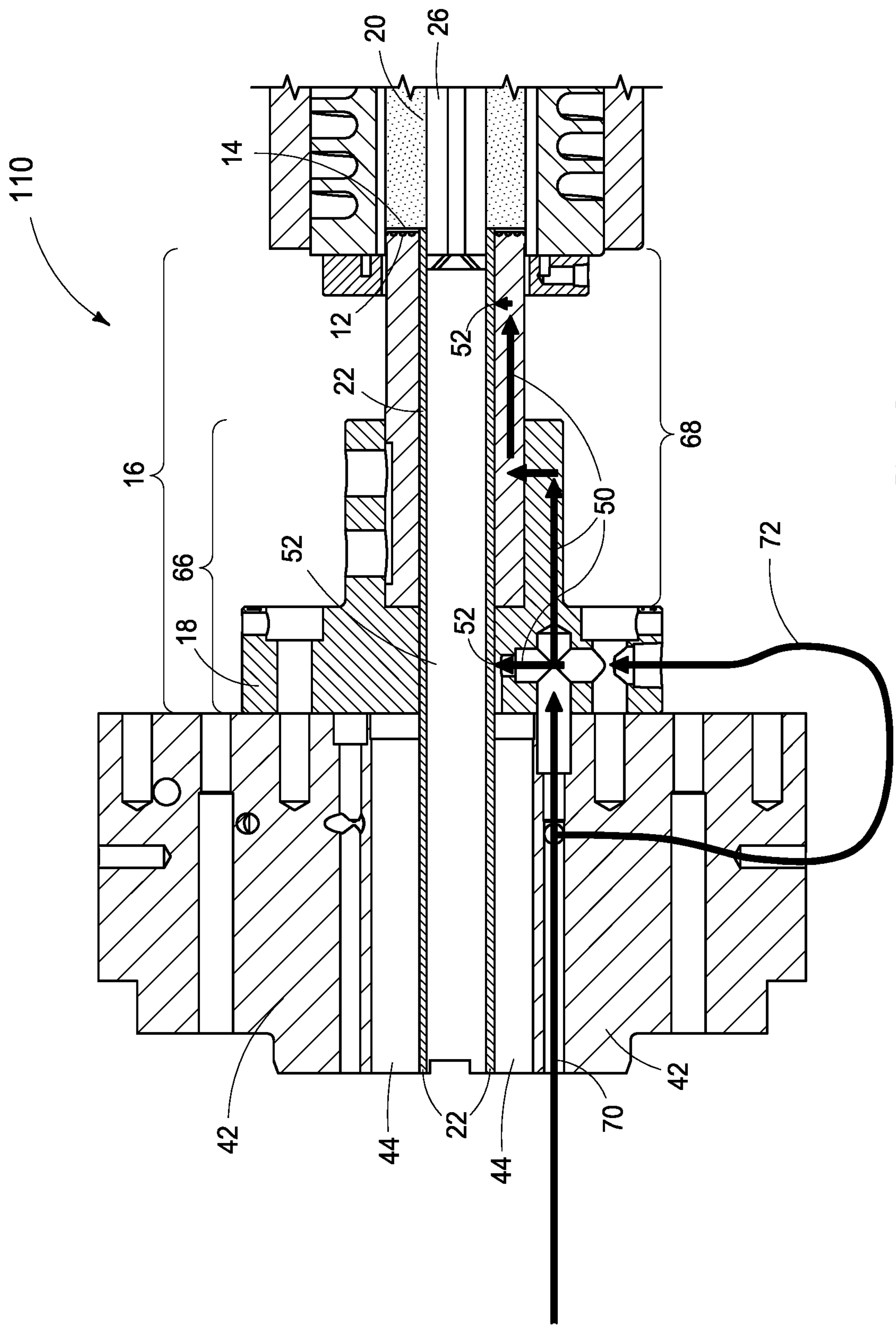
FIG. 6 is a more detailed view of a portion of a shear assisted extrusion apparatus according to an embodiment of the disclosure.
Figure 7:
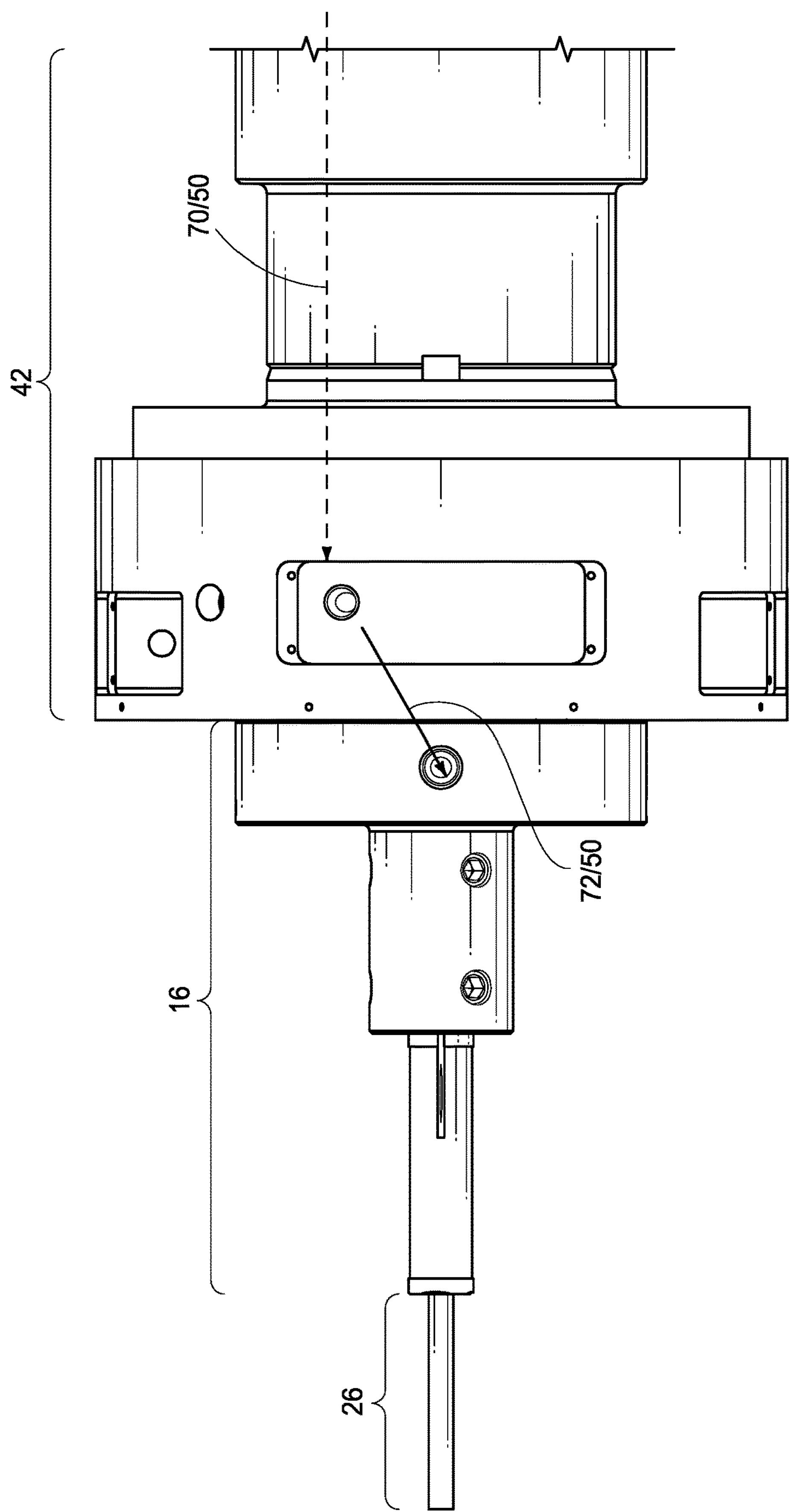
FIG. 7 is an exterior view of components of a shear assisted extrusion apparatus according to an embodiment of the disclosure.

Referring next to FIG. 6, in accordance with one particular embodiment, apparatus portion 110 can include mandrel 26 that supports feed material 20. This feed material 20 can engage die face 14 at tool head 12 and be plasticized to form extrusion material 22. In accordance with example implementations, fluid can be provided through spindle 42 that can include a spindle faceplate at passageway 70 or 72 via outside the spindle and/or via flange 18 of tool assembly 16. As depicted herein, tool assembly 16 can include tool or die holder 66 and die 68. In accordance with example implementations, passageway 50 can continue and fluid can be provided through openings 52 to within interior walls of tool 16. FIG. 7 depicts an exterior view of spindle 42 coupled with tool assembly 16 and mandrel 26. As shown, passageways 70/50 and/or 72/50 provide fluid to tool assembly 16.

Figure 8:
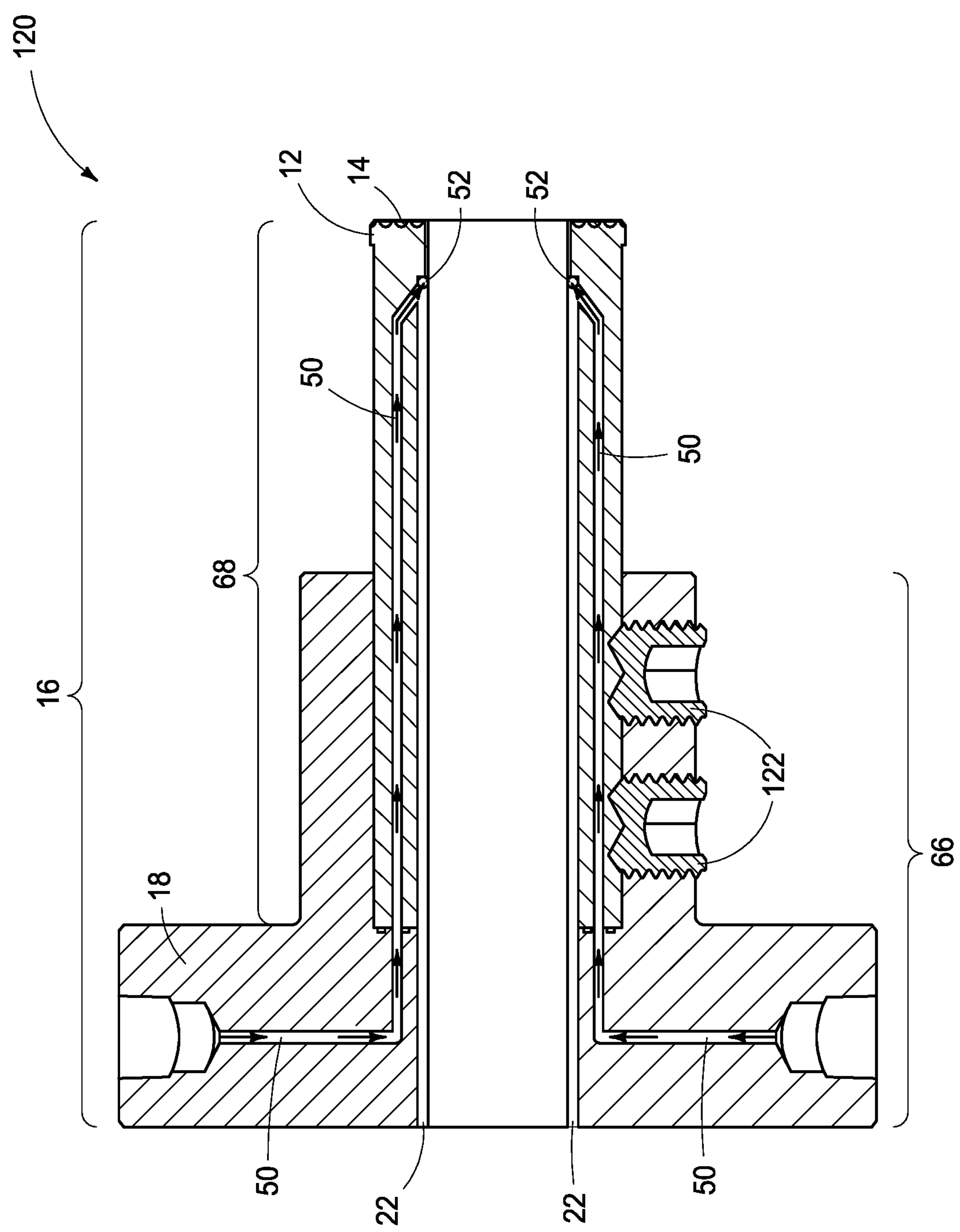
FIG. 8 is a detailed view of a portion of a shear assisted extrusion apparatus according to an embodiment of the disclosure.

Referring next to FIG. 8, another example implementation of an apparatus portion 120 of a shear assisted extrusion apparatus is shown that includes tool assembly 16 having tool holder 66 operatively coupled with tool/die 68. Tool/die 68 includes die face 14 and tool head 12. In accordance with example implementations, passageways 50 can extend through holder 66 and through walls of tool/die 68 and then be in fluid communication with openings 52 which enter into the rear face or supporting face of die face 14. At head 12 plasticized material is formed and flows to be cooled or quenched. As depicted, assembly 16 can include couplers 122 that can be used to couple tool/die 68 to holder 66.

Figure 9:
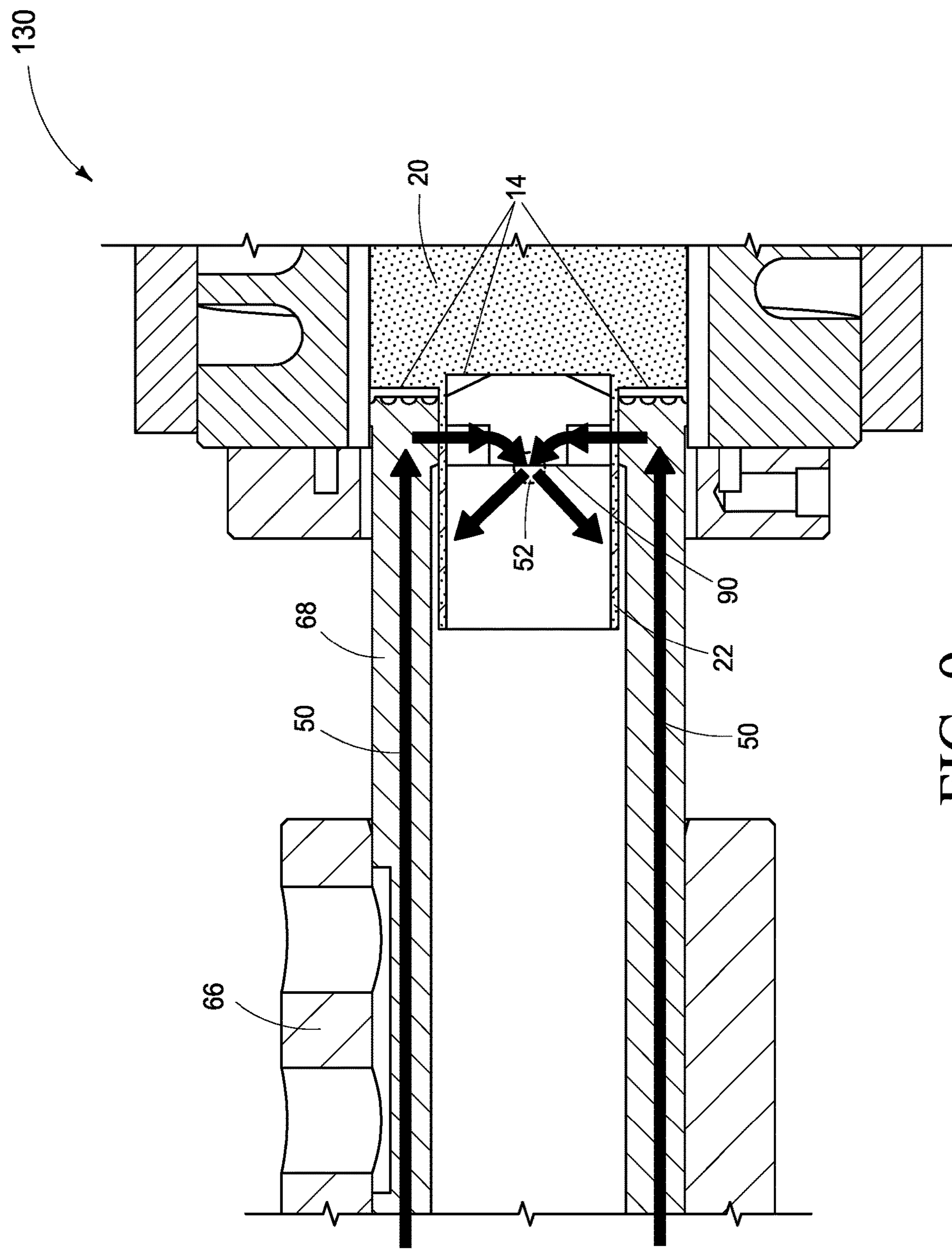
FIG. 9 is a detailed view of a shear assisted extrusion apparatus according to an embodiment of the disclosure.

Referring next to FIG. 9, in accordance with yet another implementation, apparatus portion 130 of a shear assisted extrusion apparatus is shown that includes feed material 20 engaging with die face 14 at tool head 12. In accordance with example implementations, conduit 50 can extend through tool 68 and exit at openings 52 which are located on the support or rear face 90 of die face 14.

Figure 10:
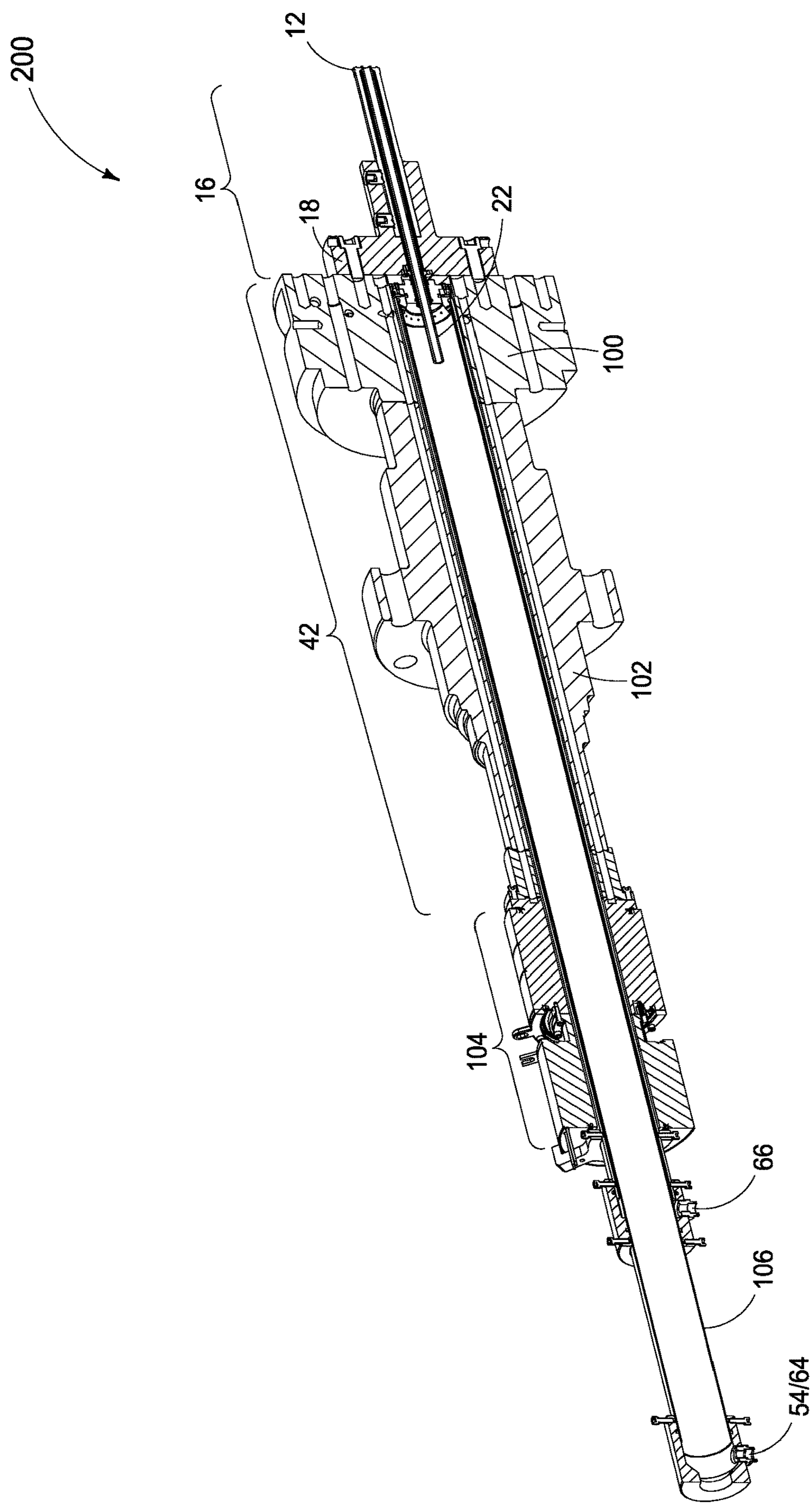
FIG. 10 is view of components of a shear assisted extrusion apparatus having a quenching insert therein according to an embodiment of the disclosure.

Referring next to FIG. 10, as shown, assembly 200 is shown that includes tool assembly 16 operatively coupled to spindle assembly 42 that includes spindle face plate 100 coupled to spindle 102. Spindle 102 is operatively engaged with rotary union 104. Within assembly 200 is quench assembly 106. Quench assembly 106 can be part of these components and/or an insert to already assembled components. Spindle assembly 42 can encompass components that rotate axially about a distance between ends of the spindle assembly, for example about a distance between tool assembly 16 and rotary union 104, face plate 100 and rotary union 104, and/or the length of spindle 102.

Figure 11:
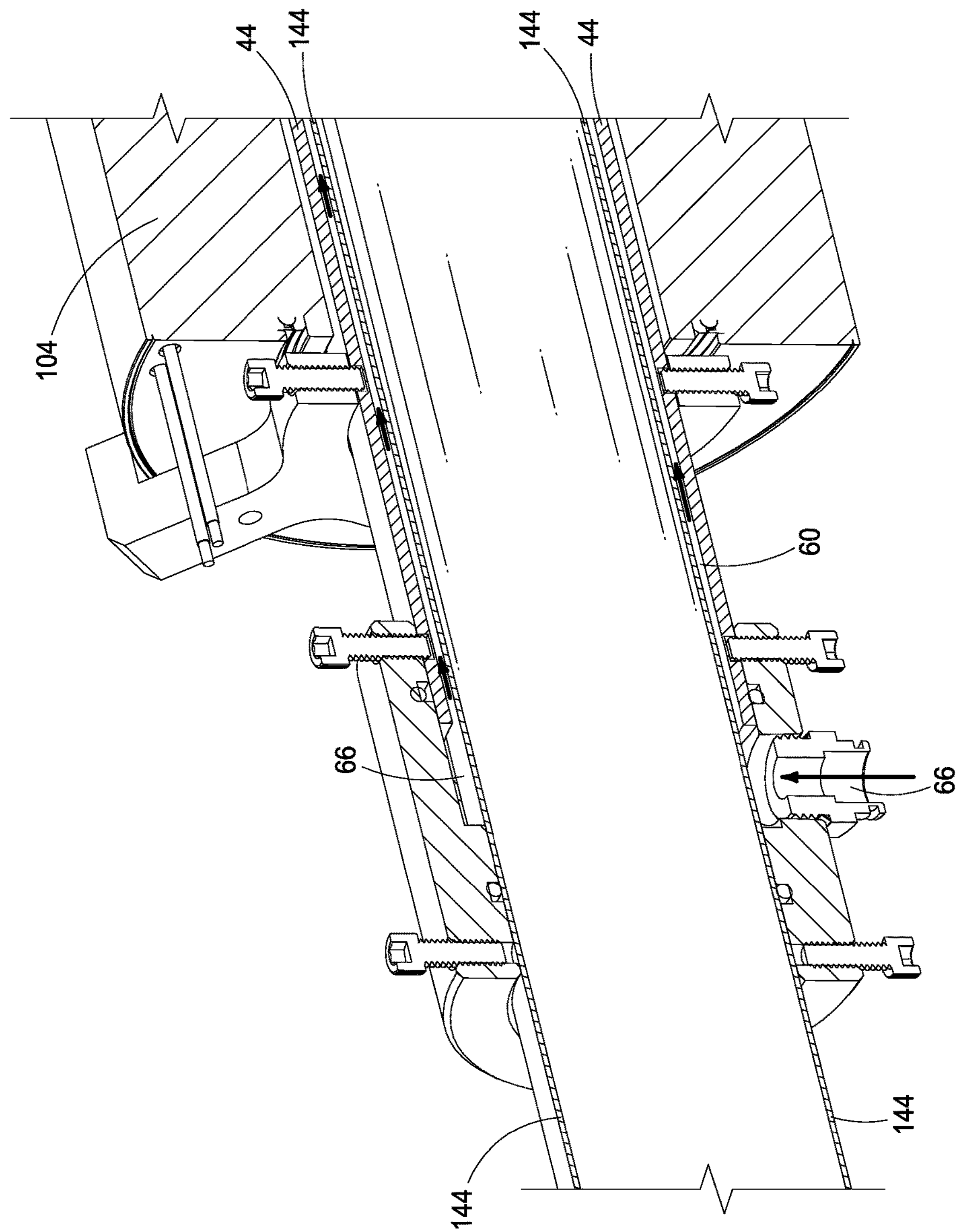
FIG. 11 is a detailed view of a portion of engagement of a quenching insert with a component of a shear assisted extrusion apparatus according to an embodiment of the disclosure.

Referring next to FIG. 11, in accordance with example implementations, fluid can be provided via intake 66 to within passageway 60 formed between receiving channel 44 and sleeve 144 to openings 62 within sleeve 144. As shown, sleeve 144 extends into rotary union 104 and continues through spindle 42.

Figure 12:
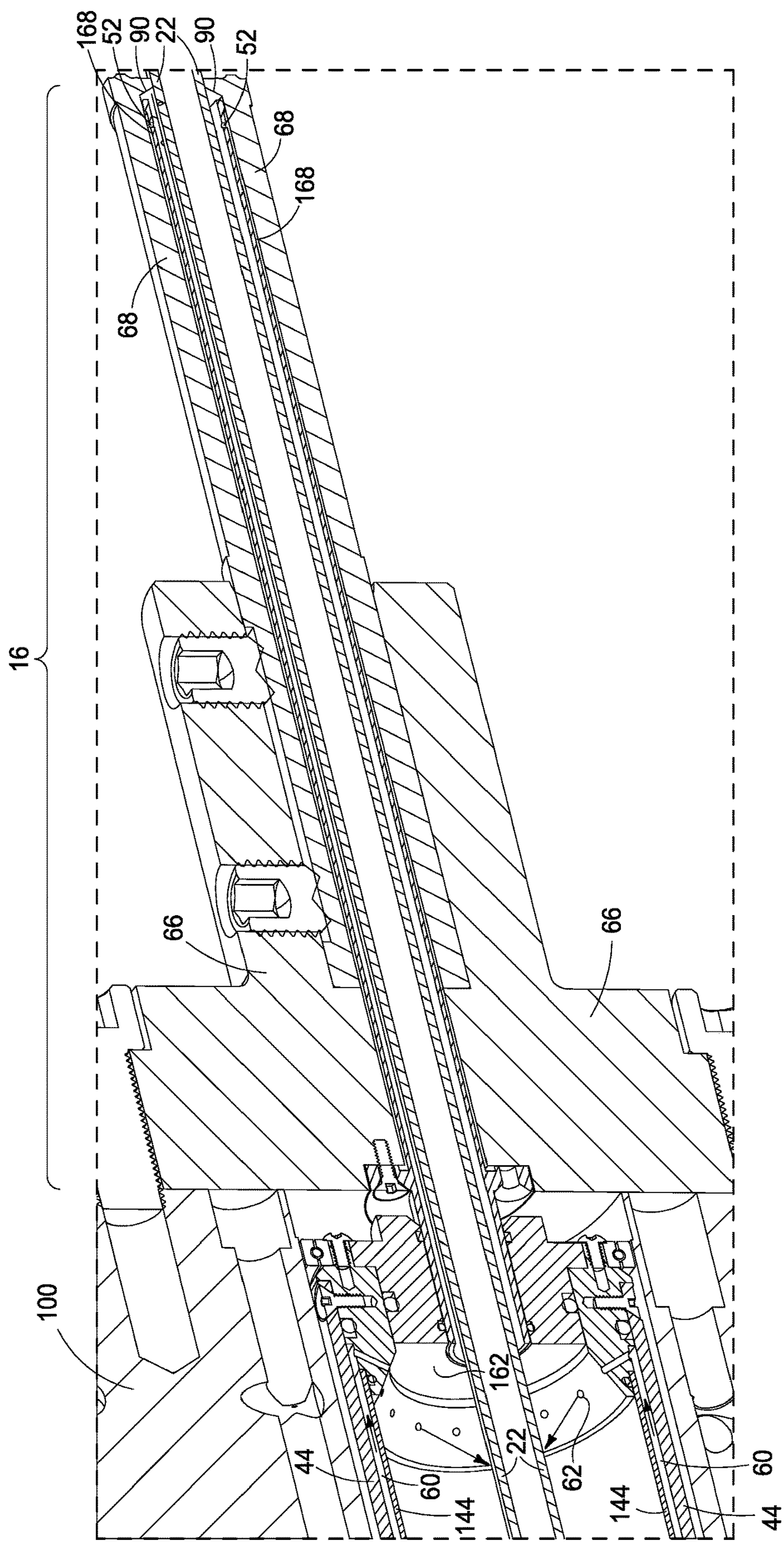
FIG. 12 is a detailed view of a portion of engagement of a quenching insert with components of a shear assisted extrusion apparatus according to an embodiment of the disclosure.
Figure 13:
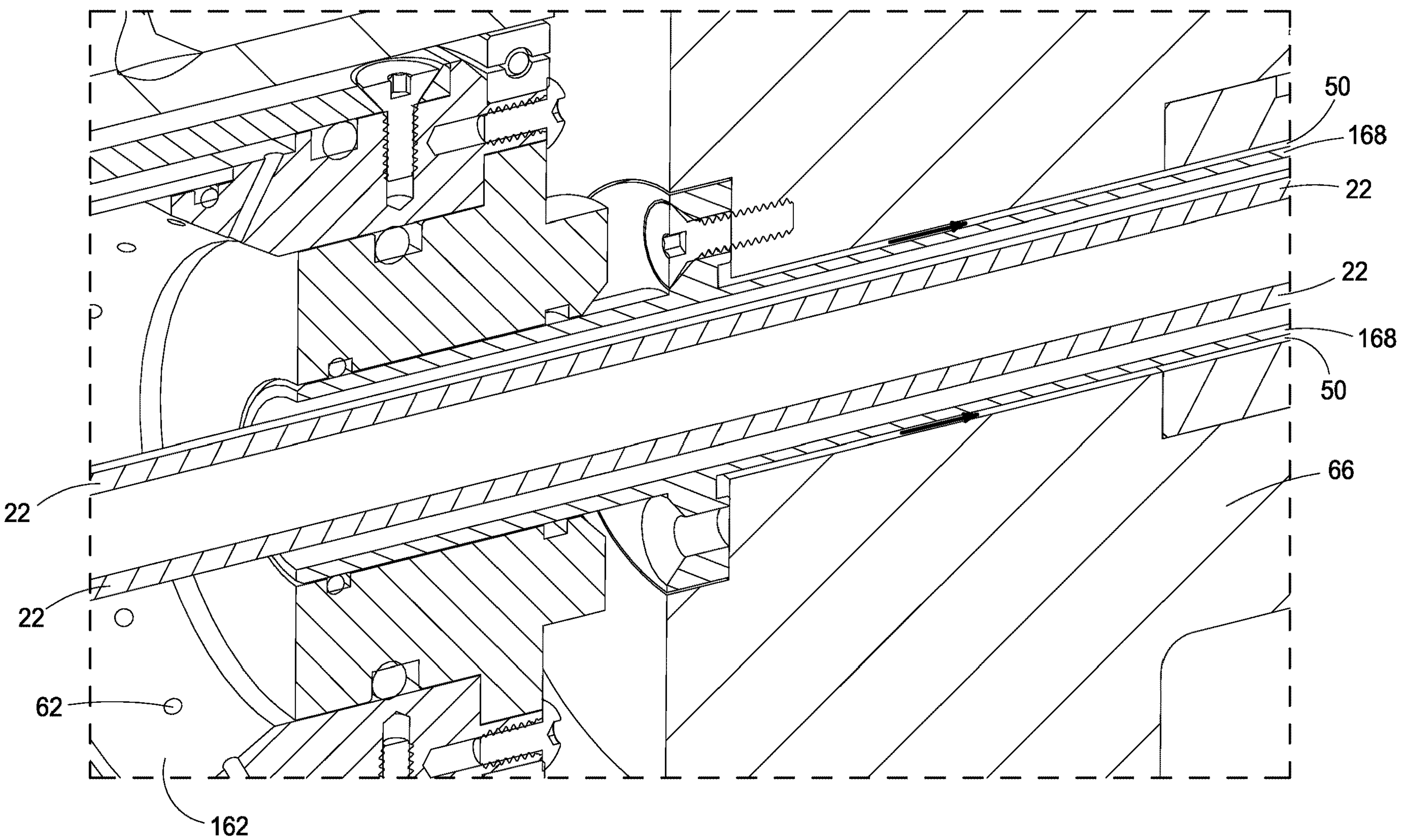
FIG. 13 is a detailed view of the components of FIG. 12 according to an embodiment of the disclosure.
Figure 14:
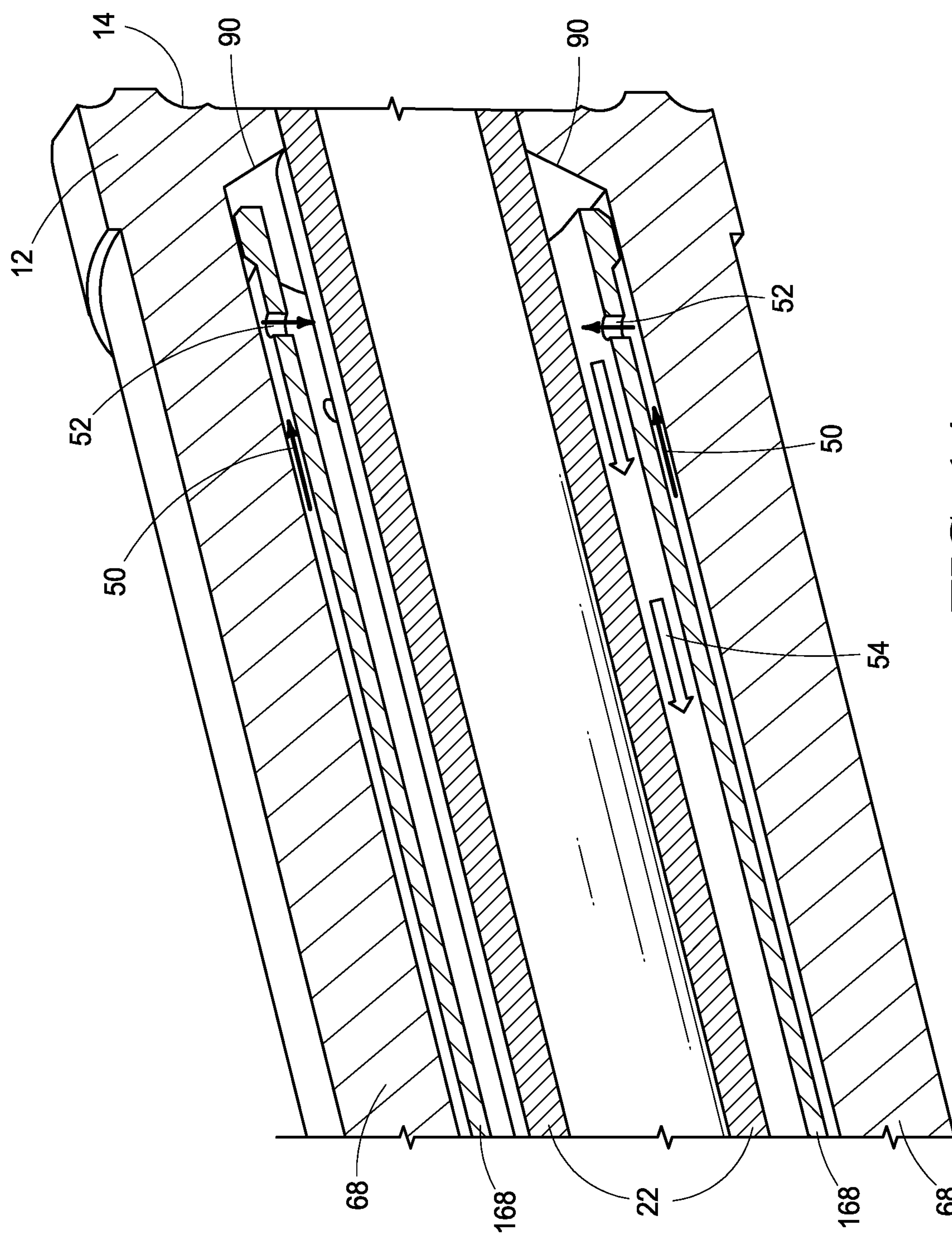
FIG. 14 is a detailed view of the components of FIG. 13 according to an embodiment of the disclosure.

Referring next to FIGS. 12-14 and with reference to previous FIG. 10, a quench assembly 106 is depicted that can extend into spindle 42 through to tool assembly 16. In particular embodiments, assembly 106 can include a quench head 162. Quench head 162 can include a plurality of openings 62 that are in fluid communication with passageways 60 provided between sleeve 144 and receiving channel 44. In accordance with example implementations, quench head 162 can be aligned within spindle faceplate 100 proximate tool assembly 16, which can be configured to receive extrusion material 22. Sleeve 168 can be operatively engaged with tool assembly 16 and extend from tool holder 66 or quench head 162 to support 90 to form passageways 50 between assembly 16 and extrusion material 22. Accordingly, fluid may be provided to passageways 60 to passageways 50 and exit within tool assembly 16 at openings 52. As shown in FIG. 14, spent or used fluid 54 is shown returning along extrusion material 22.

Figure 15:
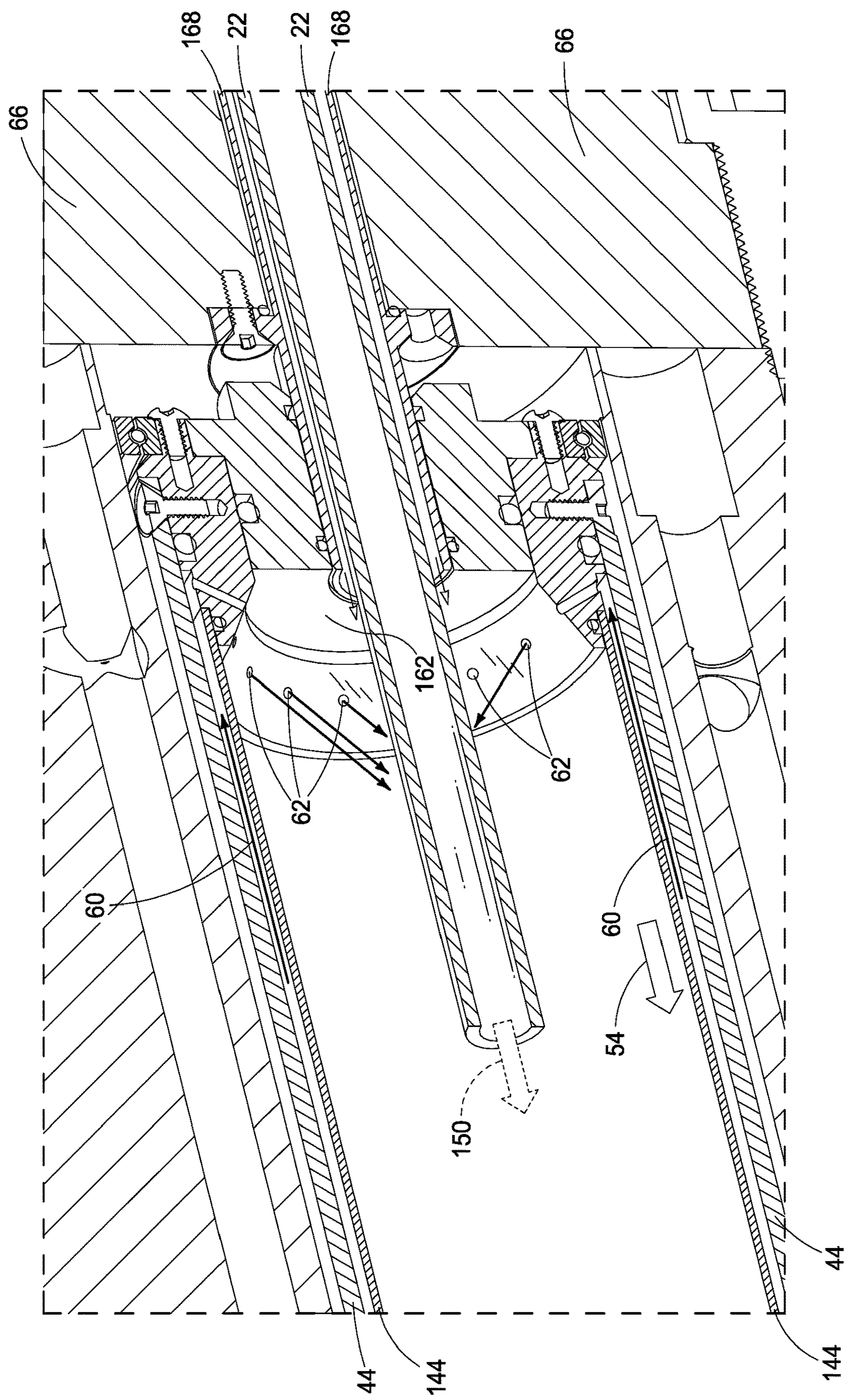
FIG. 15 is a detailed view of the components of FIG. 14 according to an embodiment of the disclosure.
Figure 17:
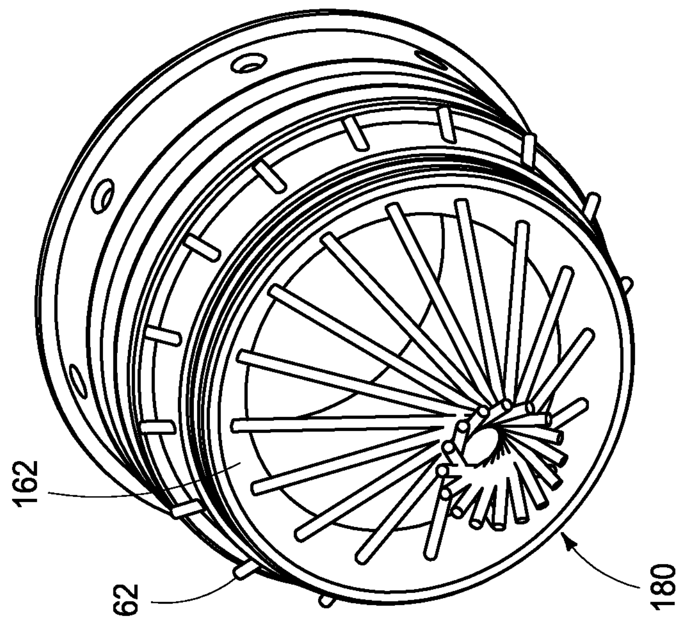
FIGS. 16 and 17 are both depictions of different quench head configurations according to an embodiment of the disclosure.
Figure 16:
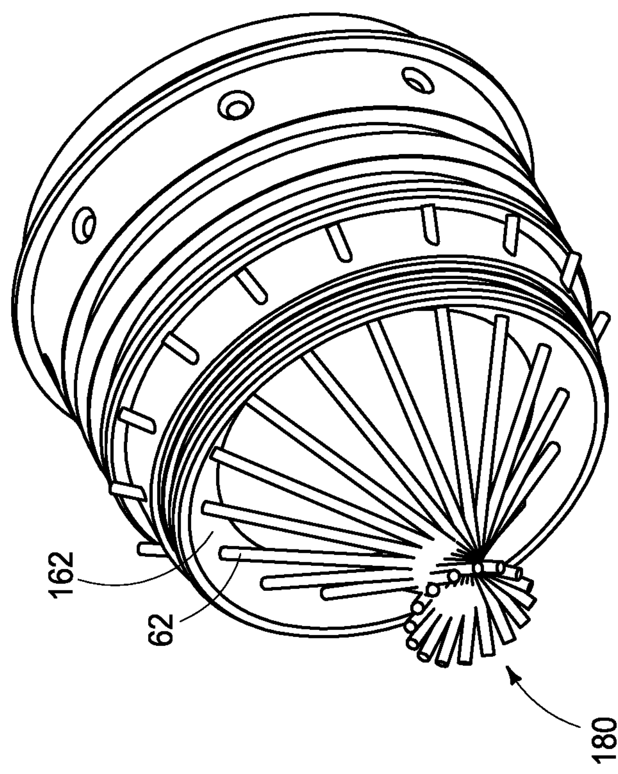

As shown in FIG. 15, fluid 54 continues along with extrusion material 22 in the direction of extrusion 150. Accordingly, fluid 54 flow can be further facilitated by fluid from openings 62. As shown in FIGS. 16 and 17, openings 62 can be configured to direct fluid flow about extrusion material without directing the fluid flow at one another. Accordingly, the fluid flow can be offset to form a radial engagement 180 of various sizes. As shown, the radius of radial engagement in FIG. 16 is smaller than the radius of radial engagement shown in FIG. 17.

Figure 18:
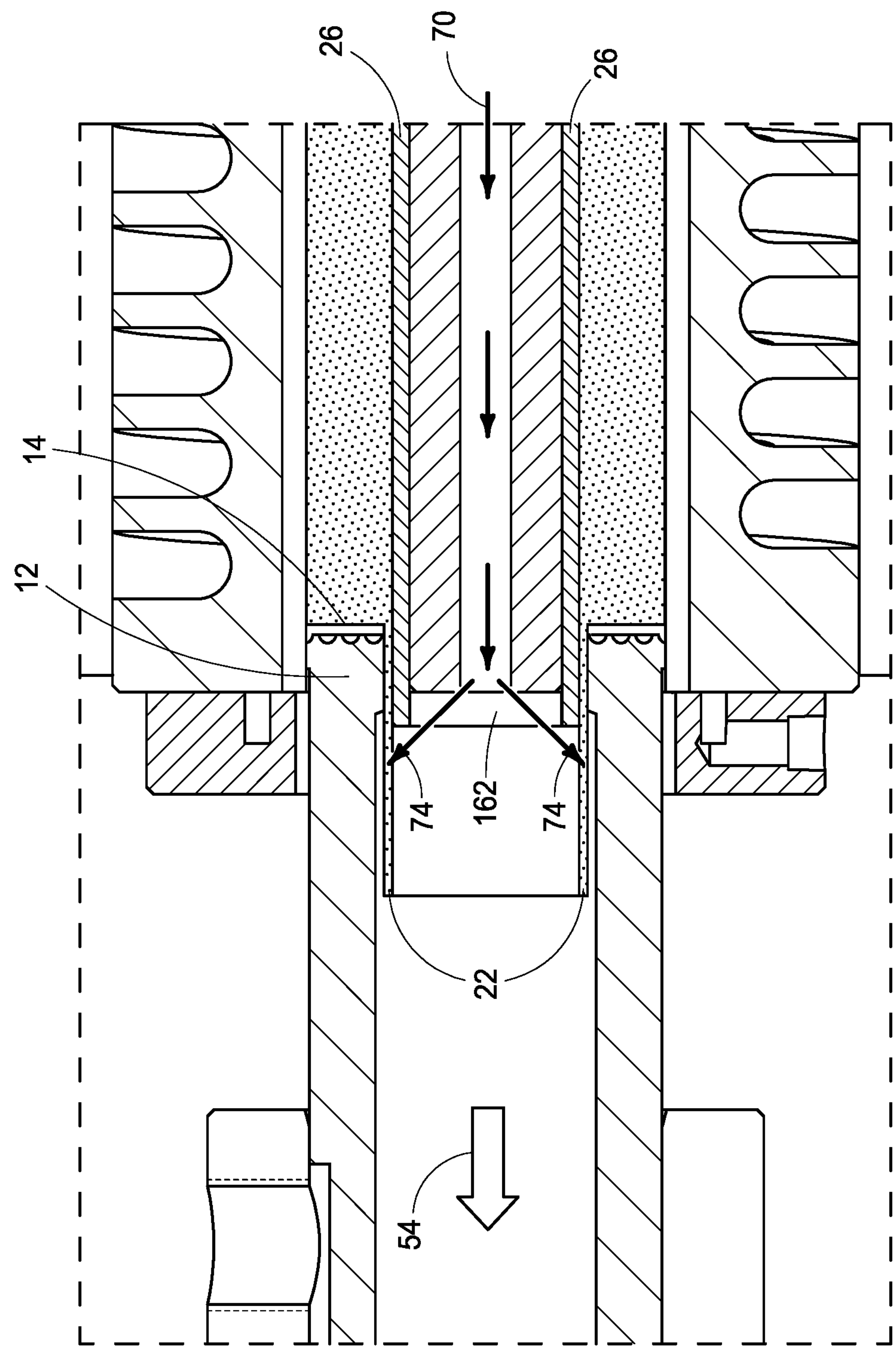
FIG. 18 is a depiction of a quench assembly within a shear assisted extrusion apparatus according to an embodiment of the disclosure.

In accordance with yet another example, as shown in FIG. 18, fluid can be provided via mandrel 26 to a quench head 162 having openings 74 to quench an interior of extrusion material 22. Spent or used fluid 54 can continue in the direction of extrusion.

Figure 19:
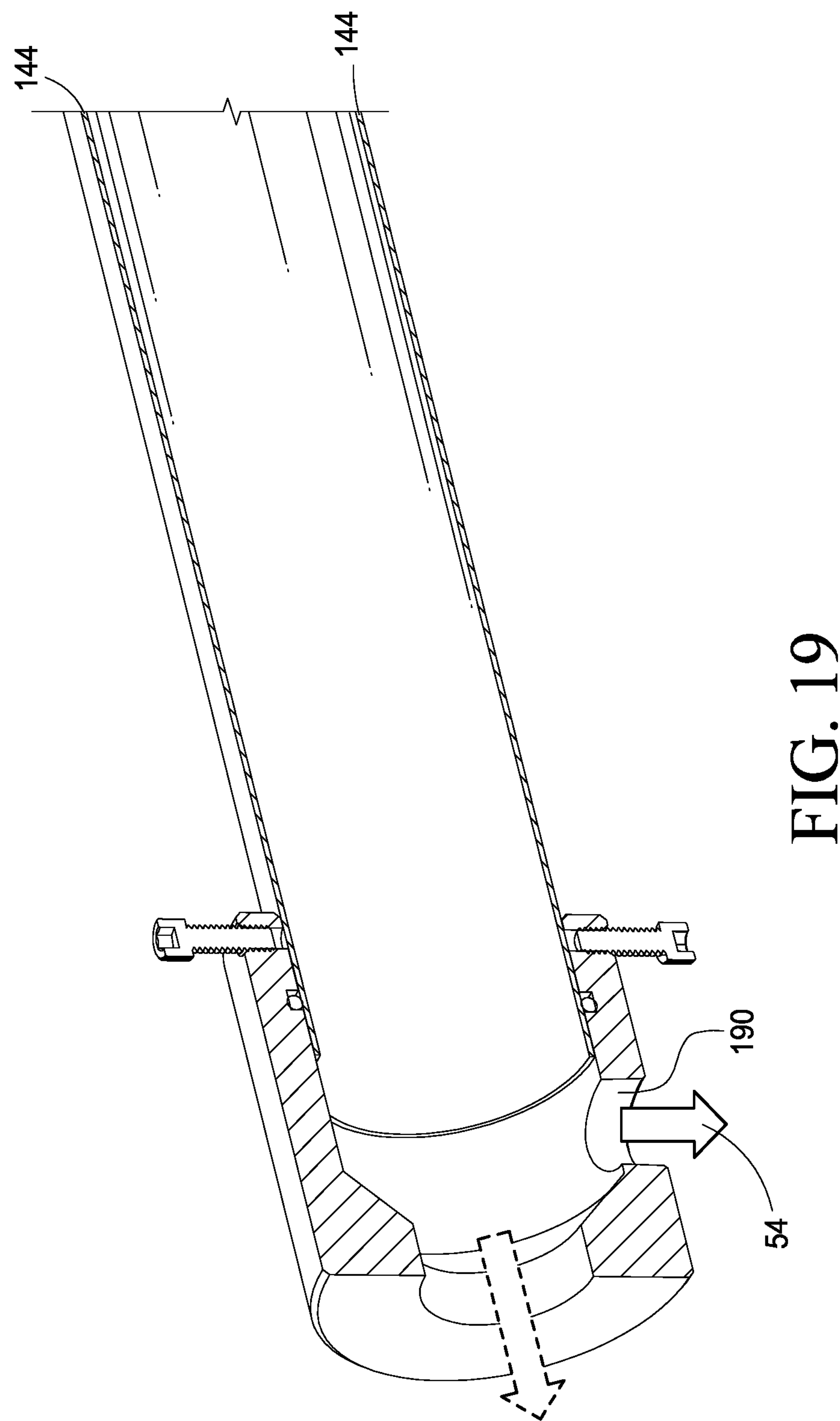
FIGS. 19 and 20 are depictions of discharge assemblies according to embodiments of the disclosure.
Figure 20:
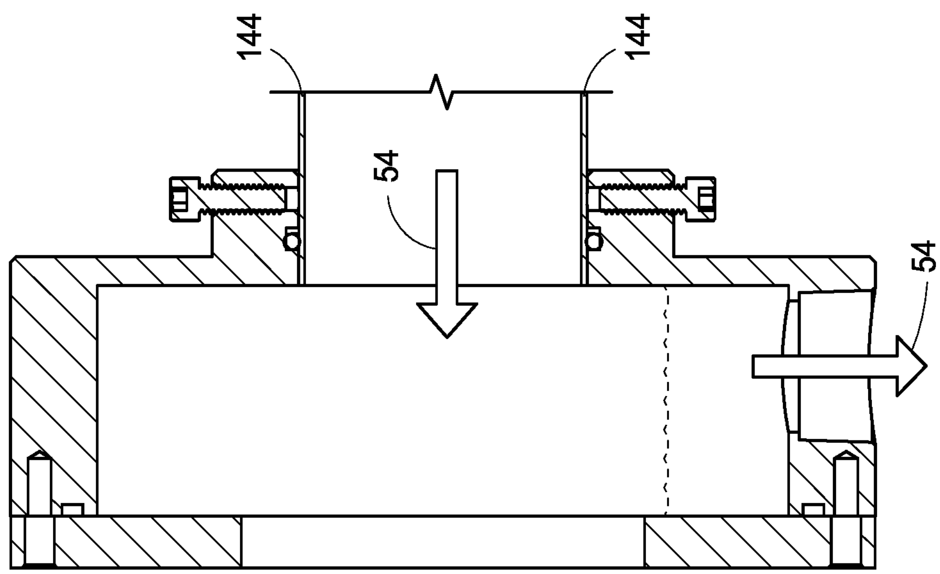

Referring next to FIGS. 19 and 20, fluid 54 can be retrieved for reuse at opening 190. Opening 190 can be part of a reservoir assembly, as shown in FIG. 20, to avoid fluid 54 continuing with extrusion material. This discharge can be recycled and then re-cooled and returned for future use.

In compliance with the statute, embodiments of the invention have been described in language more or less specific as to structural and methodical features. It is to be understood, however, that the entire invention is not limited to the specific features and/or embodiments shown and/or described, since the disclosed embodiments comprise forms of putting the invention into effect. The invention is, therefore, claimed in any of its forms or modifications within the proper scope of the appended claims appropriately interpreted in accordance with the doctrine of equivalents.

The invention claimed is:

1. A shear assisted extrusion apparatus, the apparatus comprising:
- a spindle assembly extending from a first end to a second end, the spindle assembly configured to rotate;
- a tool rotated by the spindle assembly and defining the second end of the spindle assembly, the tool defining a face that is generally perpendicular to an axial extrusion force, the face configured to engage feed material with shear force provided in part by rotation of the tool;
- a channel extending through an interior of the spindle assembly and the tool to receive extruded material, wherein the channel is defined by a wall of a fluid conduit that is fixed, about which the spindle assembly is configured to rotate; and
- one or more openings fluidically coupled with the fluid conduit and configured to convey fluid to the extruded material in the channel.

2. The apparatus of claim 1 wherein at least one of the one or more openings is within the channel between the first end and the second end along the spindle assembly.

3. The apparatus of claim 2 further comprising a fluid conduit extending between the spindle assembly and the channel.

4. The apparatus of claim 1 wherein at least one of the one or more openings is within the tool.

5. The apparatus of claim 4 wherein at least one of the one or more openings within the tool extends through an interior wall of the tool.

6. The apparatus of claim 5 wherein an interior wall of the tool supports a face of the tool, the face generally perpendicular to the channel to engage the feed material.

7. The apparatus of claim 4 further comprising a conduit extending between the spindle assembly and the tool.

8. The apparatus of claim 1 further comprising a space between the channel and the spindle assembly, the space being configured to provide fluid to the one or more openings.

9. The apparatus of claim 1 further comprising a mandrel operably engaged with the tool and defining the one or more openings.

10. The apparatus of claim 1 further comprising at least one fluid exit opening within the channel.

11. The apparatus of claim 1, comprising:
a tool conduit extending from a first end to a second end of the tool within a wall of the tool; and
one or more tool openings aligned between the first end and the second end, the one or more openings configured to convey fluid through an interior of the wall of the tool or a tool face.

12. The apparatus of claim 11 wherein the tool comprises a shank; and
wherein the tool conduit comprises a passageway extending through the shank and in fluid communication with at least one of the one or more tool openings.

13. The apparatus of claim 12 wherein the passageway extends between a first end and a second end of the shank.

14. The apparatus of claim 12 wherein the one or more tool openings extend through an interior tool wall defined by the shank.

15. The apparatus of claim 11 wherein the tool face comprises an interior portion, and at least one of the one or more tool openings extends through the interior portion of the tool face.

16. The apparatus of claim 15 further comprising a passageway within the tool conduit and in fluid communication with the one or more tool openings extending through the interior portion of the tool face.

17. The apparatus of claim 11 wherein the tool further comprises a passageway in fluid communication with the one or more tool openings through the conduit.

18. The apparatus of claim 17 wherein the passageway is configured to operably couple with a fluid intake.

19. The apparatus of claim 18 wherein the passageway is configured to operably couple with the spindle.

20. The apparatus of claim 17 wherein the second end of the tool conduit forms a flange, and the passageway extends through the flange.

21. The apparatus of claim 1, wherein the channel is defined by a quench assembly, the quench assembly comprising:
a sleeve extending within one or both of the spindle assembly or tool; and
wherein the one or more openings comprise openings extending through the sleeve to convey the fluid to the extruded material in the channel.

22. The apparatus of claim 21 further comprising a quench head operatively engaged with the sleeve, the quench head defining the openings extending through the sleeve.

23. The apparatus of claim 21 further comprising an intake operatively engaged with the sleeve.

24. The apparatus of claim 23 wherein the intake is operatively engaged with the sleeve outside the spindle assembly.

25. The apparatus of claim 21 further comprising a quench opening operatively engaged with the sleeve.

26. The apparatus of claim 25 wherein the quench opening is operatively engaged with the sleeve outside the spindle assembly.

* * * * *